(12) United States Patent
Knauer et al.

(10) Patent No.: US 6,450,677 B1
(45) Date of Patent: Sep. 17, 2002

(54) FIBEROPTIC LIGHTING SYSTEM

(76) Inventors: Robert M. Knauer, 4135 Cobbler's La., Dallas, TX (US) 75287; Kevin R. Reagan, 4135 Cobbler's La., Dallas, TX (US) 75287

(*) Notice: Subject to any disclaimer, the term of this patent is extended or adjusted under 35 U.S.C. 154(b) by 48 days.

(21) Appl. No.: 09/666,754

(22) Filed: Sep. 21, 2000

(51) Int. Cl.[7] .................................................. F21V 5/00
(52) U.S. Cl. ....................... 362/551; 362/554; 362/562; 362/581; 362/582; 362/511; 362/556
(58) Field of Search ................................. 362/554, 562, 362/581, 582, 551, 556, 511; 385/28, 120

(56) References Cited

U.S. PATENT DOCUMENTS

| | | | |
|---|---|---|---|
| 4,613,931 A | | 9/1986 | Messinger |
| 4,933,816 A | | 6/1990 | Hug et al. |
| 4,975,810 A | | 12/1990 | Vanderbel |
| 5,111,367 A | | 5/1992 | Churchill |
| 5,345,531 A | | 9/1994 | Keplinger et al. |
| 5,602,948 A | | 2/1997 | Currie |
| 5,613,752 A | | 3/1997 | Vezard |
| 5,639,153 A | | 6/1997 | Bibbiani et al. |
| 5,690,408 A | * | 11/1997 | de la Peña .................... 362/32 |
| 5,784,510 A | | 7/1998 | Davis |
| 5,838,865 A | * | 11/1998 | Gulick ........................ 385/121 |
| 5,982,969 A | | 11/1999 | Sugiyama et al. |
| 6,056,426 A | | 5/2000 | Jenkins |
| 6,217,204 B1 | * | 4/2001 | Arima ......................... 362/551 |
| 6,243,520 B1 | * | 6/2001 | Goldman .................... 385/115 |
| 6,257,750 B1 | * | 7/2001 | Strasser et al. ............. 362/559 |
| 6,272,269 B1 | * | 8/2001 | Naum ........................... 385/43 |
| 6,275,633 B1 | * | 8/2001 | Lei .............................. 385/100 |

* cited by examiner

Primary Examiner—Sandra O'Shea
Assistant Examiner—Anabel Ton
(74) Attorney, Agent, or Firm—Richard C. Litman

(57) ABSTRACT

A fiberoptic lighting system includes a remotely located light source with one or more fiberoptic cables extending therefrom. The cables may be linked with various coupler and splitter devices to link additional cables to the light source, and to provide a series of light emitting fixtures at the distal ends of the cable runs. The present system is particularly well suited for use in emergency situations, where a fuel, chemical, explosive, or other hazardous spill has occurred, as in a gasoline truck accident. The remotely located light source is placed well clear of the hazardous spill area, where it is immune to explosive, fire, and/or other hazards which might exist closer to the hazard area. The light source of the present system thus need not require fireproof and explosive proof certification and periodic recertification, thus saving considerable costs for the users of the device. The light fixtures of the present system basically comprise two different types, with a first type having a translucent gel center for transmitting light. The gel center may comprise a chemiluminescent reactive material, to provide further light. The second type includes a fiberoptic bundle therein, with individual strands being captured by one or more retainer plates or fittings therein to direct the light output of the strands in a predetermined pattern as desired. The present light source, cables, and light output fixtures may be linked as desired by a series of compatible connectors and splitters, to provide lighting units over a wide area as desired.

19 Claims, 7 Drawing Sheets

FIBEROPTIC LIGHTING SYSTEM

BACKGROUND OF THE INVENTION

1. Field of the Invention

The present invention relates generally to portable, modular lighting systems, and more specifically to a lighting system using fiberoptic transmission lines from a remotely located light source. The present lighting system is very versatile, but is particularly well adapted for use in emergency situations where an explosive, combustion, electrical, or other hazard may exist if an electrical lighting system is used.

2. Description of the Related Art

Numerous portable lighting systems for use in emergency or other situations, have been developed in the past. Most all such systems rely upon electrical power and transmission to a plurality of electric lights, be they incandescent, fluorescent, arc lamps, or other type of electric light. Such lighting systems work well, where there is no hazard of fire, explosion, electrical shock, and/or other hazard due to their deployment. However, emergency situations involving fuel and other chemical spills, etc., occur with increasing frequency in the modern world, and such electric lighting systems are not always compatible with the hazards involved with such spills.

This is particularly true of highway traffic, where large trucks play an ever increasing role in the carriage of a wide variety of goods and materials. Gasoline trucks, trucks carrying explosives and fireworks, and other trucks carrying potentially hazardous cargo, have the potential to create a widespread disaster in the event of an accident. Accordingly, practically every area of the country has emergency personnel who are trained to cope with such an occurrence, and to take steps to minimize the environmental and other damage which may occur due to an accident involving such cargo.

Perhaps the worst possible scenario for such an accident would be at night, where lighting is poor at best in comparison to daylight conditions. Again, most emergency response units are well equipped to handle such situations, and have various types of emergency lighting available. However, such emergency lighting is invariably of the electric type, and while such electric emergency lighting is generally required to meet very stringent safety checks, there is still some chance that the breakage of such an electric light may provide an ignition source for any explosive or fuel spill in the area, resulting in a major disaster. Emergency crews are well aware of this possibility, and there are regulations requiring frequent checks and inspections for "explosive proof" lighting systems which may be used in such hazardous environments. Nonetheless, any lighting system utilizing electrical energy at each light outlet, still carries with it the potential for disaster when combined with a major fuel spill or similar hazard.

Accordingly, a need will be seen for a lighting system which completely eliminates all electrical and heat energy at each of the light outlets of the system, with the only energy output being light Additional safety may be provided by means of ultraviolet light filtration at the light source(s), thereby assuring that no chemical reaction may be triggered by such ultraviolet light where ultraviolet light sensitive chemicals are present. While the present fiberoptic light system is particularly well suited for use in chemical, fuel, and explosive spills and other similar hazardous environments, it will be seen that it may also be used in virtually any environment where portable, supplemental lighting is desired.

A discussion of the related art of which the present inventor is aware, and its differences and distinctions from the present invention, is provided below.

U.S. Pat. No. 4,613,931 issued on Sep. 23, 1986 to Elmar K. Messinger, titled "Portable Fiberoptic Light Source For Use In Hazardous Locations" describes a light source having an explosion proof connector, flame paths and cooling fins, and various shielding means therewith. The Messinger light source would appear to meet the safety standards for such devices which place the electrical and heat energy of the light source within the hazardous area. In contrast, the present lighting system keeps the light source well away from the hazardous area, transmitting only light to the hazardous area by one or more fiberoptic cables. Also, Messinger does not disclose multiple fiberoptic cable outputs nor any light fixture specifics, as provided by the present invention.

U.S. Pat. No. 4,933,816 issued on Jun. 12, 1990 to William F. Hug et al., titled "Inspection/Detection System With A Light Module For Use In Forensic Applications," describes a relatively small, portable unit having only a single fiberoptic cable output. The device is relatively low powered, being intended only for forensic use where a relatively small but specialized light output is desired. Hug et al. provide a series of optical filters at the light box, but the device is primarily directed to ultraviolet output in order to cause various substances (fingerprint powder, etc.) to become fluorescent or luminescent when illuminated by the Hug et al. light. Moreover; Hug et al. provide laser illumination, which is not at all suitable for providing continuous lighting over a widespread area for an extended period of time, as provided by the present light system.

U.S. Pat. No. 4,975,810 issued on Dec. 4, 1990 to Frans G. Vanderbel, titled "Light Source," describes a relatively small, portable fiberoptic device having only a single light output line. This is due to the Vanderbel device being intended for use in the medical field, where the single light device is used by a medical practitioner for localized illumination of a single area under examination. This teaches away from the present invention, with its multiple light output fixtures for illuminating a relatively large area. Moreover, the Vanderbel device (as well as the Hug et al. device described above) emits its light axially, rather than radially from the light output fixture as provided by the present invention.

U.S. Pat. No. 5,111,367 issued on May 5, 1992 to David L. Churchill, titled "Fiber Optic Lighting Device," describes a light source having a plurality of fiberoptic light outlets therein. Churchill also discloses provision for ultraviolet and infrared filtration of light emitted from his light source, by coating the polished output lens ends of the device. The present fiberoptic lighting system may also provide infrared and ultraviolet filtration, if so desired; these features are well known and conventional. However, Churchill fails to disclose any details of the light fixtures disposed at the distal ends of the fiberoptic cables used with his device, whereas such light fixtures in their various embodiments are a part of the present invention.

U.S. Pat. No. 5,345,531 issued on Sep. 6, 1994 to John S. Keplinger et al., titled "Optical Fiber Lighting Apparatus And Method" describes a decorative fiberoptic lighting system wherein a fiberoptic cable formed of a plurality of strands, is masked selectively to provide light output at various spaced apart locations along the cable. The light source emits varying colors of light, which when passed along the fiberoptic cable to be viewed through the masked exterior of the cable, appear to be a series of slowly moving light "packets" traveling along the cable. The Keplinger et al. device is directed to a relatively low light output device for decorative purposes and cannot provide high intensity lighting for illuminating a large area. Moreover, Keplinger et al. do not disclose any form of light fixture at the distal end of their cable, as provided by the present invention.

U.S. Pat. No. 5,602,948 issued on Feb. 11, 1997 to Joseph E. Currie, titled "Fiber Optic Illumination Device," describes a device intended for personal emergency lighting use. Currie provides a light source (either self contained, or by means of an existing automotive light or the like) with a fiberoptic cable which may be extended to illuminate an area for roadside automotive repairs or the like. The Currie device requires only a single fiberoptic cable, as it is intended to illuminate only a small area; the complexities of multiple cable outlets, splitters, etc. are not required by Currie, whereas they are needed with the present invention. Also, while Currie provides for radial illumination from the sides of the cable, he does not provide any form of radial illumination from the light fixture itself disposed at the distal end of the cable, as provided by the present device.

U.S. Pat. No. 5,613,752 issued on Mar. 25, 1997 to Nicolas Vezard, titled "Tunable High Intensity Forensic Light," describes a small, hand held device having radial light output from the distal fixture end thereof, with a generally circular filter disc attached thereto. The user may rotate the filter disc to provide infrared, ultraviolet, or colored filtration of the light emanating from the end of the device, as desired. As in the case of the Hug et al. '816 U.S. Patent discussed further above, the Vezard device is intended for use in the forensics field, and thus is not directed to multiple light output fixtures, radially emanating light from those fixtures, or provision for relatively clear lighting, as provided by the present lighting system invention.

U.S. Pat. No. 5,639,153 issued on Jun. 17, 1997 to Stephen C. Bibbiani et al., titled "Light Head Assembly With Remote Light Source," describes various embodiments of light emitting devices having light supplied by fiberoptic means. Bibbiani et al. do not provide any form of modular system for their lighting, as provided by the present invention with its modular light transmission cables and various fixtures which may be assembled therewith as desired. Moreover, Bibbiani et al. do not disclose the generally cylindrical light fixture configuration of the present system, which may provide for either radial or axial light emission from the fixture. Bibbiani et al., as well as all other prior art of which the present inventor is aware, does not provide a structure which is free of metals to provide a spark free and electrically insulating device for safe use in fuel and explosive spill areas, as provided by the present invention.

U.S. Pat. No. 5,784,510 issued on Jul. 2.1, 1998 to James M. Davis, titled "Intensity Adjustable Fiberoptic Cable Apparatus," describes a system having intensity adjustment means located at the output end of the device, in addition to such means at the light source. Davis uses a conventional, well known iris shutter as the light control mechanism for his device, which mechanism may also be employed with the present fiberoptic lighting system. However, Davis does not disclose any means of providing multiple light fixtures from a single light source, radially emanating light from light fixtures, or structure providing for safe operation in an explosively hazardous environment, as provided by the present device.

U.S. Pat. No. 5,982,969 issued on Nov. 9, 1999 to Hideo Sugiyama et al., titled "Optical Transmission Tube, Making Method, And Linear Illuminant System," describes a method for manufacturing solid core fiberoptic light cables with one side being reflective, to reflect light passing through the cable radially outwardly from one side of the cable. Sugiyama et al. do not disclose any separate light fixtures, modular elements, or explosive and fire safe construction or materials for their fiberoptic cables, as provided by the present fiberoptic light system invention.

Finally, U.S. Pat. No. 6,056,426 issued on May 2, 2000 to David R. Jenkins, titled "Monolithic Beam Shaping Light Output Light Device," describes a fiberoptic system incorporating a single light source and splitting the fiberoptic cables into at least two light output devices. Jenkins is particularly concerned with providing a well defined beam direction from each of his light output devices, and does so by shaping the light transmitting rod immediately upstream of the conical light emitting lens, and further providing Fresnel lenses for his light output devices. Jenkins thus teaches away from the present invention, with its radial light emission from the light output fixtures. Moreover, Jenkins does not disclose any structure providing for an explosive or fire safe operation of his lighting system, as provided by the present invention.

None of the above inventions and patents, taken either singly or in combination, is seen to describe the instant invention as claimed.

SUMMARY OF THE INVENTION

The present invention comprises a portable fiberoptic lighting system for temporary use in various environments where supplemental lighting is required. The present lighting system is particularly well adapted for use in emergency situations, where a fuel, explosive, and/or other hazardous material spill has occurred. The present system is modular, with a single light source providing illumination to one or more light output devices or fixtures which are in turn distributed at the scene as required. The light source is placed well away from any hazardous (flammable and/or explosive) materials, and thus may be made and operated less expensively than explosive safe light sources which require periodic recertification.

Additional connectors and splitters may be provided with the present lighting system, to provide one or more light output fixtures which may be positioned as required. Ultraviolet and/or infrared filtration may be provided at the light output source, thus precluding any hazard due to ultraviolet reactive chemicals or heat hazard. The fiberoptic cables, connectors, splitters, and light output fixtures are each formed of nonmetallic, electrically insulative materials and thus may be used without hazard in the immediate vicinity of explosive and/or flammable chemicals. The light output devices may comprise predetermined distributions of fiberoptic strands therein to produce a light emission pattern as desired, or may alternatively include a light emitting fluid (liquid, gel, etc.) therein, which may be photochemically reactive.

Accordingly, it is a principal object of the invention to provide an improved fiberoptic lighting system having a remotely located light source, which system is particularly adapted for use in emergency situations and environments where fuel, explosive, and/or other hazardous chemical spills have occurred.

It is another object of the invention to provide an improved light system which light source may include ultraviolet, infrared, and/or other light filtration means selectively deployed therewith.

It is a further object of the invention to provide an improved light system including cable coupler and splitter means, providing for multiple fixtures receiving light from a single source.

An additional object of the invention is to provide an improved lighting system which light fixtures comprise different embodiments providing radial and/or axial light output as desired.

Still another object of the invention is to provide an improved lighting system which different light fixture embodiments may include a plurality of fiberoptic strands in a predetermined arrangement for directing light output directionally as desired, or which may include a fluid or gel filled light emitting core, which fluid or gel may be photo-chemically reactive for additional output.

It is, an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
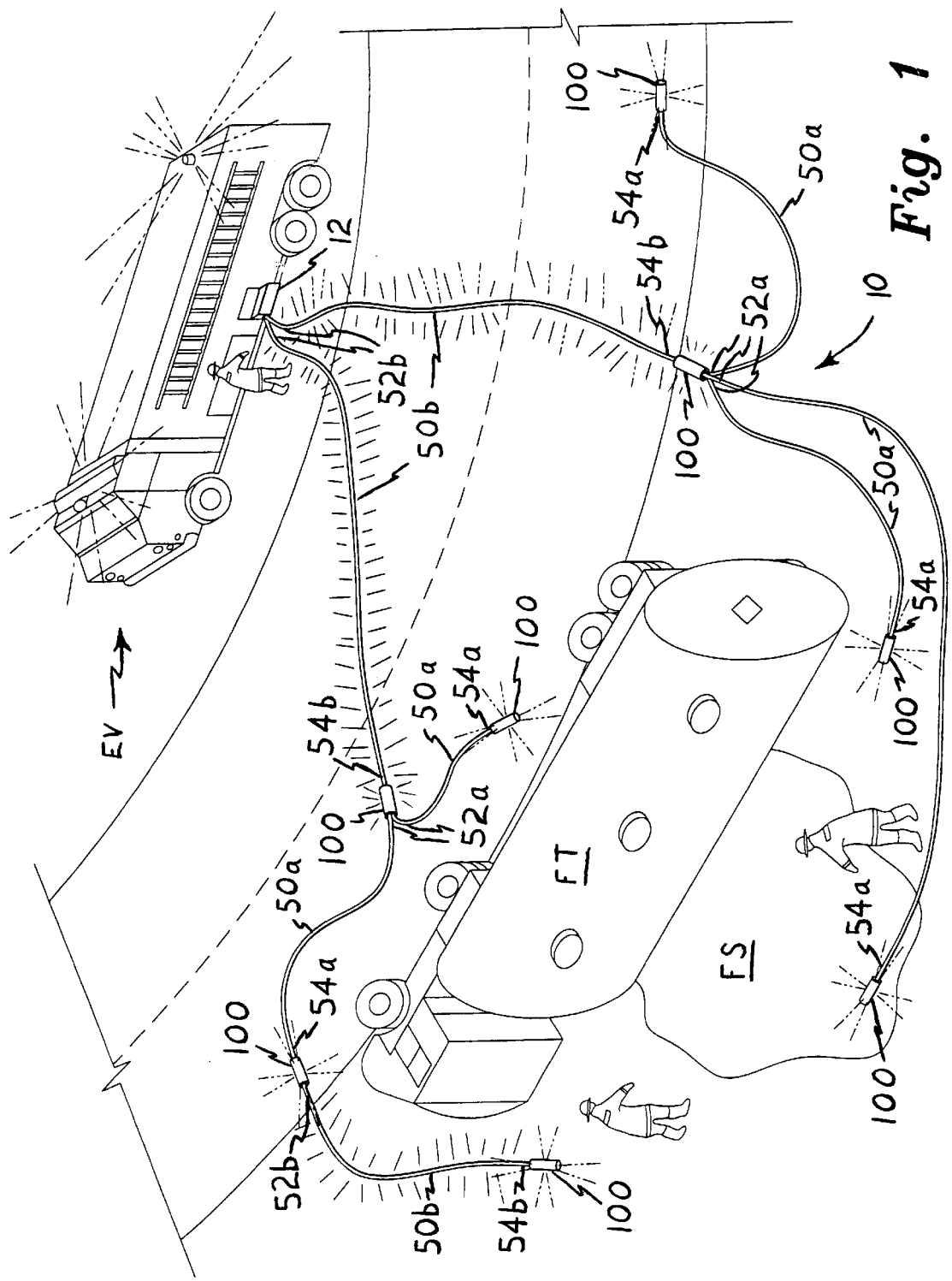
FIG. 1 is an environmental perspective view of the present invention, showing the present fiberoptic lighting system deployed in a hazardous environment.

The present invention comprises a fiberoptic lighting system, generally indicated by the reference numeral 10 in FIG. 1 of the drawings. The present lighting system 10 is modular in its configuration, with various components which may be interchangeably assembled as needed to meet a given situation or deployment. The present system 10 is primarily directed to temporary use for lighting in emergency situations and environments, but it will be seen that the system 10 may be used in other, non-emergency situations and environments as well, if so desired.

A primary advantage of the present system 10 is indicated in FIG. 1 of the drawings, wherein the electrically powered light source 12 is remotely deployed from any fire, explosive, chemical, or other hazard at an emergency site. In the exemplary deployment illustrated in FIG. 1, the conventional light source 12 remains with the emergency vehicle EV, well removed from the fuel spill FS flowing from the overturned fuel truck FT. Thus, any fire or explosive hazard which might exist due to the heat and electrical circuitry of the light source 12, is well removed from the hazardous material and is no more a danger than the operation of the emergency vehicle EV and its engine and electrical components. The present invention will be seen to provide the same advantages in the event of an emergency involving explosives, gases, hazardous chemicals, and other hazardous material spills as well.

The present system 10 essentially comprises a series of different light transmitting components or elements, which may be linked together in a modular array as exemplified in FIG. 1. The electrically powered light source 12 provides a source of high intensity light for the remainder of the system 10 by means of at least one light output port 14, as shown in detail in FIG. 5 of the drawings. It will be seen that provision for multiple light output ports may be made, as is known in the art. The light source 12 generally comprises a box or enclosure 16, an on/off switch and/or other control means 18, circuit protection 20, and cooling means (e. g., electric fan) 22. A power cord 24 extends from the box 16 to a suitable conventional electric power source (not shown), such as an AC generator provided on the emergency vehicle EV, or other suitable power source. The above described lighting source 12 is conventional, and thus no further detail need be described or disclosed herein.

A great advantage of the present system 10 is that the remote deployment of the light source 12 relative to any fire, chemical, and/or other hazards, enables the light source 12 to be constructed conventionally, without great concern for explosive and fireproof construction. This greatly reduces the cost of the device, in comparison to more complex devices for deployment within hazardous spill areas. The cost of operation of the present system is greatly reduced as well, as the present light source 12 need not receive periodic (and costly) recertification inspections and checks, as required for explosive and fireproof light sources.

Figure 5:
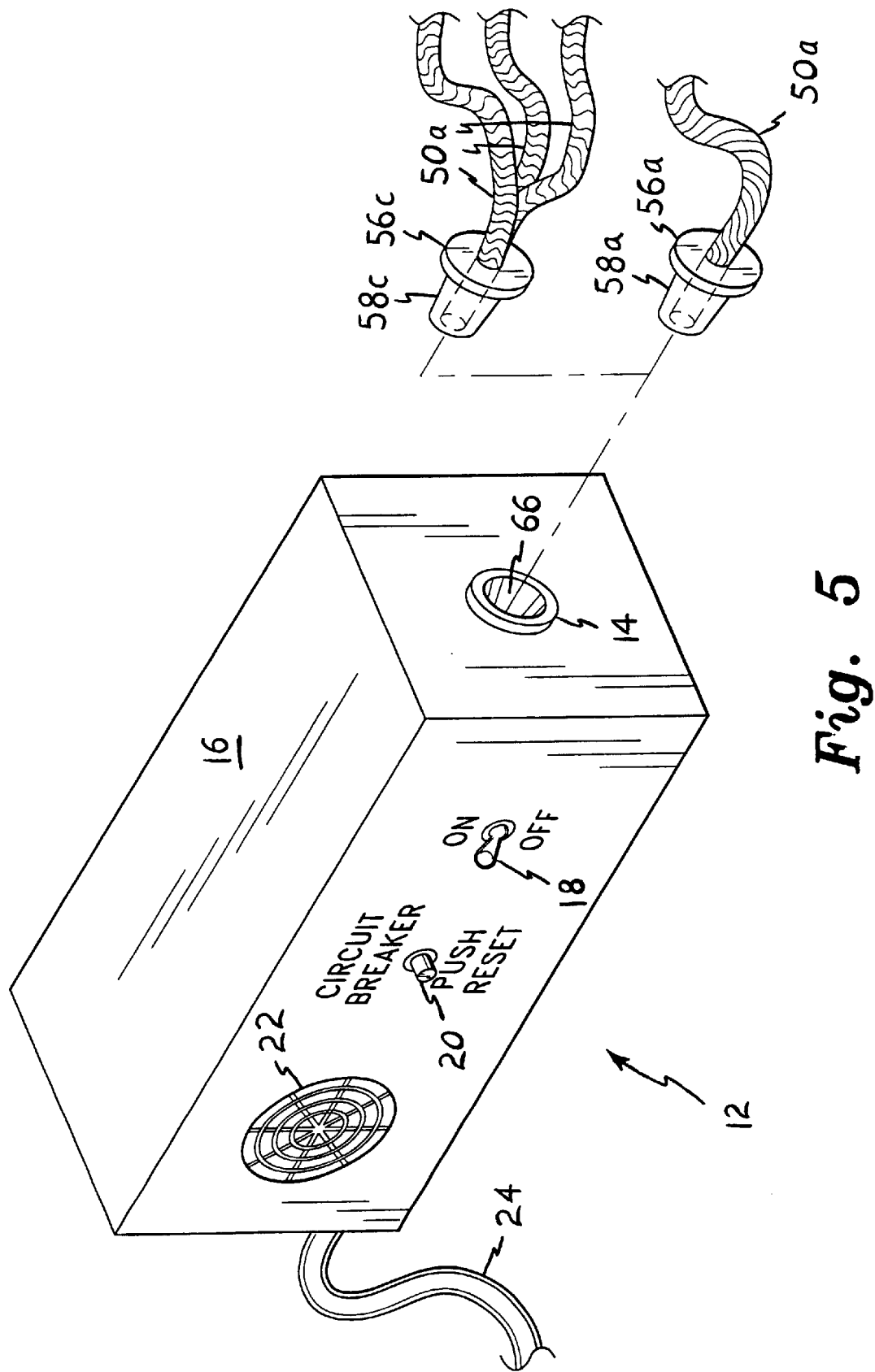
FIG. 5 is an exploded perspective view of a light source with alternative single and multiple fiberoptic cable connectors for use with the present invention.

At least one (or a plurality of) fiberoptic cables 50a and 50b are connected to the light source 12, as shown in FIGS. 1 and 5 the drawings. The cables 50a and 50b differ from one another in that the first cable type 50a is covered, coated, or otherwise sealed to preclude radial light emission from the walls of the cables 50a. Cables 50b may have transparent or translucent walls to pass light radially therethrough, with the light passage being enhanced by providing additional light dispersion means (e. g., refractive surfaces, etc.) to the cable 50b walls, if so desired. Radially transmitting cables 50b can be most useful in delineating a hazard area, e. g., as shown in FIG. 1 extending across the roadway R to as a warning of the hazardous condition. Non-emergency uses for such radially emitting cables 50b might also be envisioned, e. g., as lighting for garden paths, aisle lighting in theaters, and other areas where electric power may not be desired.

Each cable 50a, 50b has a first or light source connection end, respectively 52a and 52b, and an opposite distal light output end, respectively 54a and 54b. Cables 50a, 50b may be symmetrical with the two ends 52a, 54a of cables 50a and ends 52b, 54b of cables 50b having identical configurations. This permits either of the ends of the cables to be temporarily and removably connected either to a light input device or to a light output device, with no need for considering different fittings and incompatible connectors between different cables and the opposite ends of the cables. This is an important consideration in an emergency situation, where ease of use for rapid deployment may be critical.

Figure 6:
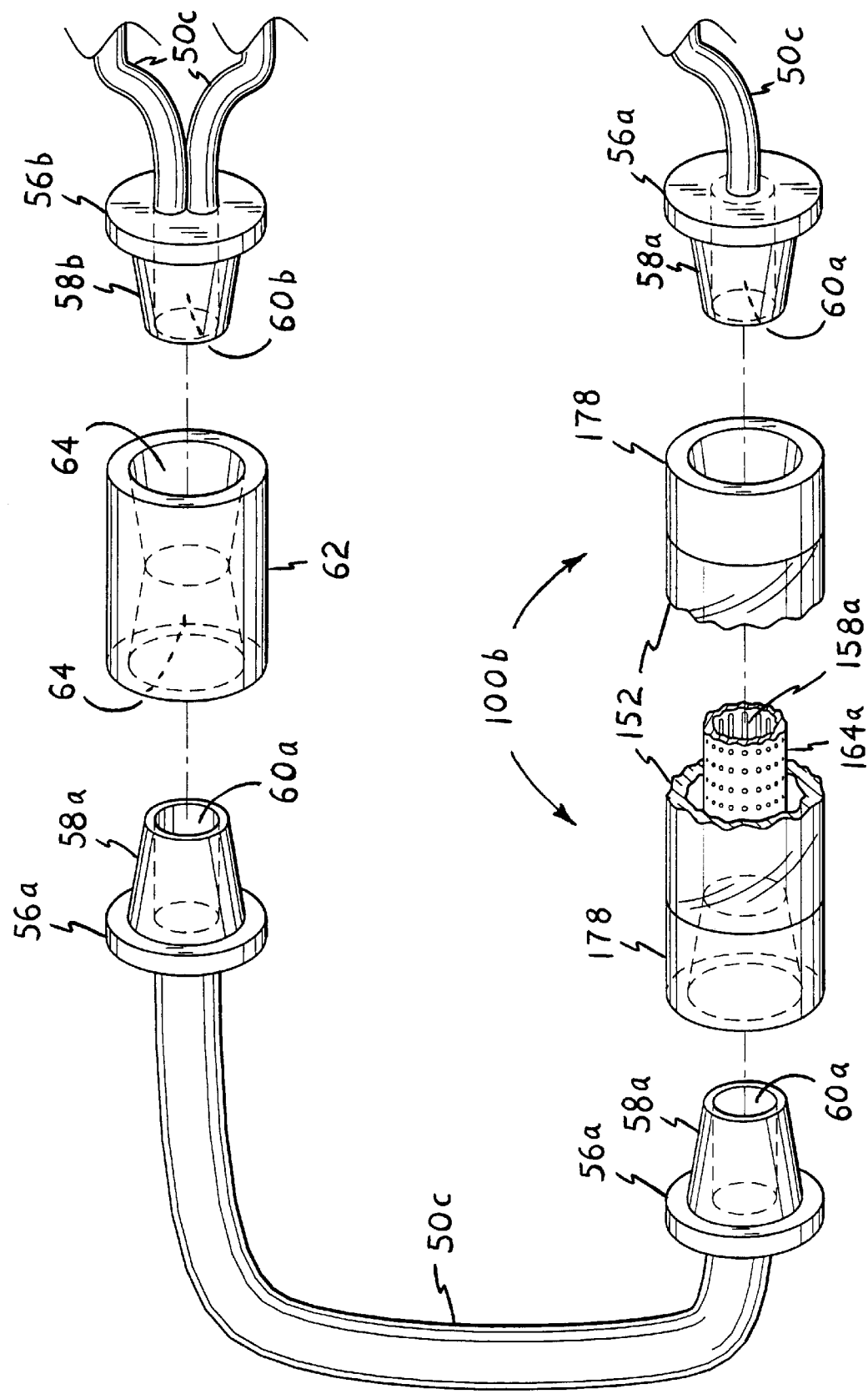
FIG. 6 is an exploded perspective view showing details of various embodiments of connector and splitter elements of the present invention.

One such connection means may be achieved by various conically shaped mating connector ends provided at each of the cable ends and at other points in the system. FIGS. 5 and 6 illustrate such mating conical connector ends, with the multiple strand cables 50a of FIG. 5 and solid core cables 50c of FIG. 6 (which may have light transmissive walls, as in the cables 50b, if desired) each having a conical connector end at each end 52a, 54a (or 52c, 54c) thereof.

These connector ends are generally similar, but differ depending upon whether they provide for single or multiple ("splitter") connector attachment. Each connector end 56a through 56c (depending upon the number of cables extending therefrom) comprises an external or convex conical wall, respectively 58a through 58c, having a central light passage, respectively 60a through 60c, extending axially and concentrically through the connector end. Single connector end 54a has a single fiberoptic cable 50a, 50b, or 50c attached thereto and extending therefrom, with splitter connector end 54b having two such cables and splitter connector end 54c having three such cables. It will be seen that any practicable number of fiberoptic cables 50a through 50c may have a corresponding connector end 54a through 54c attached thereto, to provide single or multiple cable extensions as desired.

FIG. 6 also discloses a mating internal or female conical shape connector component 62. The connector component 62 is longitudinally and radially symmetrical, having two opposed female or internal conical walls 64 therein. These two conical shapes 64 are concentric with one another and have essentially the same cone or taper angle as the connector ends 56a through 56c, and define a light passage therethrough. Any of the conical portions 58a through 58c of the cable connector ends 56a through 56c may be plugged into either of the corresponding internal conical sections 64 of the connector component 62, to temporarily and removably connect any of the cable lengths 50a through 50c together as desired, as shown generally in FIG. 6 of the drawings. The light output port 14 of the light source 12 of FIG. 5 has a similar internal conical wall 66, enabling any of the male conical shapes 58a through 58c of their respective connector ends to be removably and temporarily connected to the light source 12 as desired.

The connector plugs 56a through 56c and their corresponding receptacles 62 (and 14, shown in FIG. 5) are preferably formed of a relatively hard and durable, yet slightly resilient, plastic material, to provide the desired grip between components as they are assembled together. Preferably, all cables 50a through 50c, connector components 56a through 56c, fittings 62, and light output fixtures (discussed below) are completely devoid of any metallic or electrically conductive materials, to provide a non-metallic, electrically non-conductive and spark free system which is safe for use in fuel, explosive, chemical, and other hazardous spill conditions.

One or more (preferably a series of, as shown in FIG. 1) light output fixtures 100 is provided with the present fiberoptic lighting system 10, for illuminating the area of concern. These fixtures 100 may be of either of two different types or embodiments, with a first embodiment fixture 100a being illustrated in FIG. 2 of the drawings.

The light output fixture 100a includes a sealed, translucent (which includes transparency) light transmission cartridge or insert 102, having a first end 104 and opposite second end 106. The cartridge 102 is filled with a translucent or transparent liquid or gel, which disseminates the light from the attached fiberoptic cable. The liquid or gel may be a chemiluminescent substance, if desired, which fluoresces or otherwise produces additional light when energized by the light passing therethrough from the attached fiberoptic cable. Other liquids (e. g., tinted water, oil, etc.) as desired may be used to provide the desired light diffusion within the cartridge 102.

A translucent (or transparent) outer cover 108 having a first end 110 and opposite second end 112, corresponding to the first and second ends 104, 106 of the cartridge 102, surrounds the cartridge 102. A first end cap 114 is secured to the first ends 104 and 110 respectively of the cartridge 102 and cover 110, with a second end cap 116 being secured to the opposite second ends 106 and 112 of the cartridge 102 and cover 110 to capture the cartridge 102 and cover 110 between the two end caps 114, 116.

At least one of the two end caps 114, 116, e. g., the first end cap 114, has a fiberoptic cable connector port and light passage 118 passing concentrically therethrough, providing for the removable attachment of one of the fiberoptic cable embodiments of the present invention thereto. A connector means extends from the first end cap 114, for removably securing a fiberoptic cable, e.g., cable 50c, to the light output fixture 100a. The connector means may comprise a conventional threaded axial clamp, with the tightening of a nut 120 about a correspondingly threaded outer sleeve 122, tightening a concentric inner sleeve (not shown) about the end of the fiberoptic cable to secure the cable to the light output fixture. Other temporary and removable cable to light fixture attachment means may be provided as desired.

The opposite second end cap 116 may be configured as shown, with a closed end (with an internal central depression, not shown, for seating the second end 106 of the cartridge 102). However, it will be seen that two identical first end caps 114 may be assembled to both ends 104, 106 and 110, 112 respectively of the cartridge 102 and cover 108, thus allowing connection of a fiberoptic cable to both ends of the device 100a, i. e., for the installation of the light output fixture 100a in series with a pair of fiberoptic cables, as shown for at least one fixture in FIG. 1. This allows light to be emitted radially from the cartridge 102 and through the translucent outer cover 108, and also to continue to pass through the second cable extending from the end connector extending from the cartridge second end 106 and cover second end 112.

Figure 2:
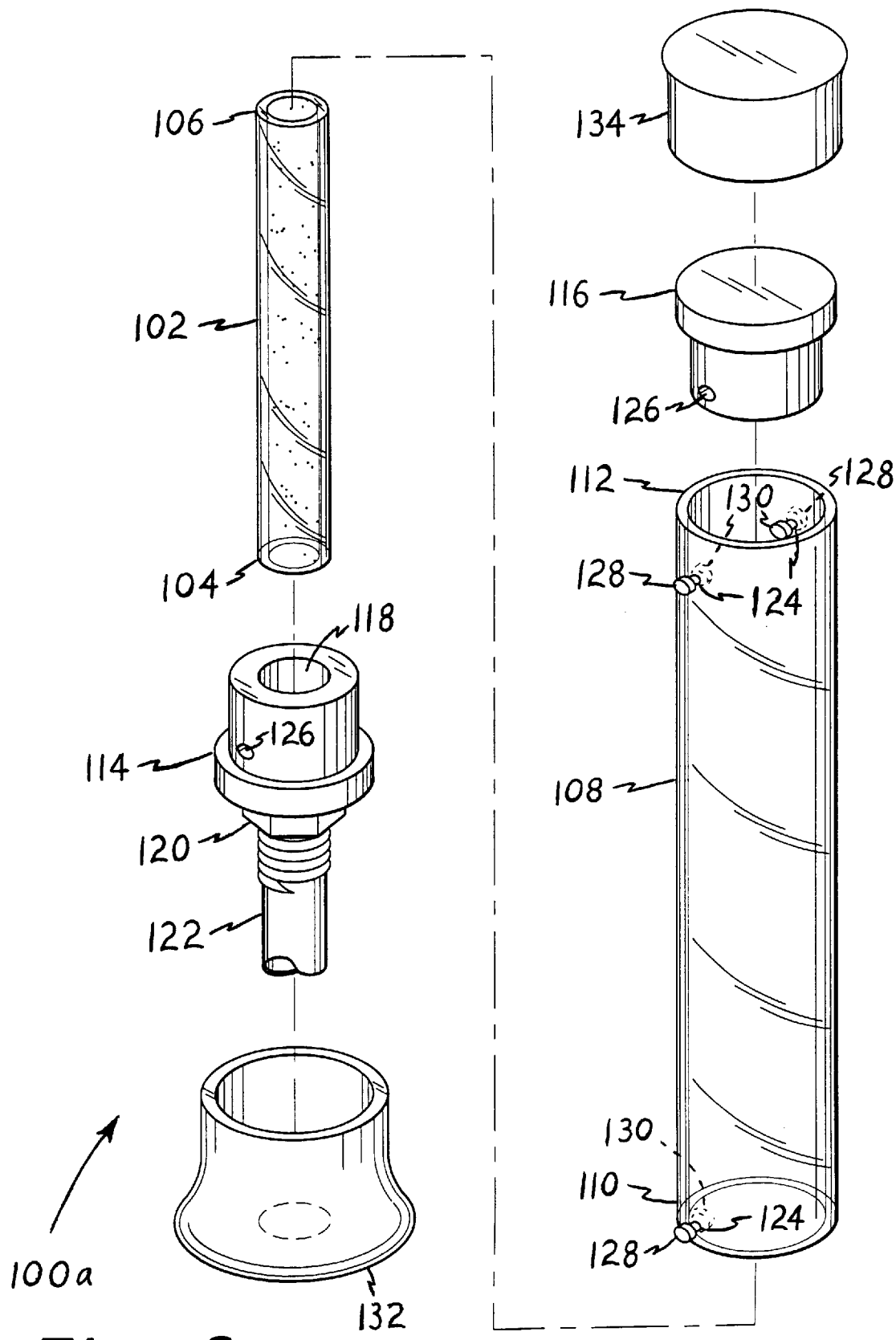
FIG. 2 is an exploded perspective view of a first embodiment of a light output fixture of the present system having a fluid filled light emitting core, showing the various components thereof.

The light output fixture 100 of FIG. 2 is formed of a series of interchangeable components, as noted generally above. Disassembly is provided by means of radially extending pins 124 which extend through the sides of the outer cover 108 to engage mating, closely fitting radially disposed holes 126 in the end covers 114, 116. The pins 124 are formed of a non-metallic, electrically non-conductive material (plastic, etc.) in order to provide the desired safety features of the present invention. The pins 124 include outer and inner flanges, respectively 128 and 130, which serve to capture the pins 124 within their respective passages through the walls of the outer cover 108 to preclude loss of the pins 124. The outer flanges 128 also provide gripping means for withdrawing the pins 124 from the mating holes 126 in the end caps 114 and/or 116.

Thus, the light emitting cartridge 102 contained within the light output fixture 100 may be easily exchanged merely by removing the first and second dust caps or seals 132, 134 from the respective first and second end caps 114, 116, withdrawing the pins 124 from the corresponding holes 126 of one of the end caps 114 or 116, removing the end cap, and exchanging the light emitting cartridge 102 as desired. Thus, different colored lighting (e. g., red, for warning and preservation of night vision, white for brighter illumination, a chemiluminescent cartridge, etc.) may be interchangeably provided in the light fixture 100, as desired.

Figure 3A:
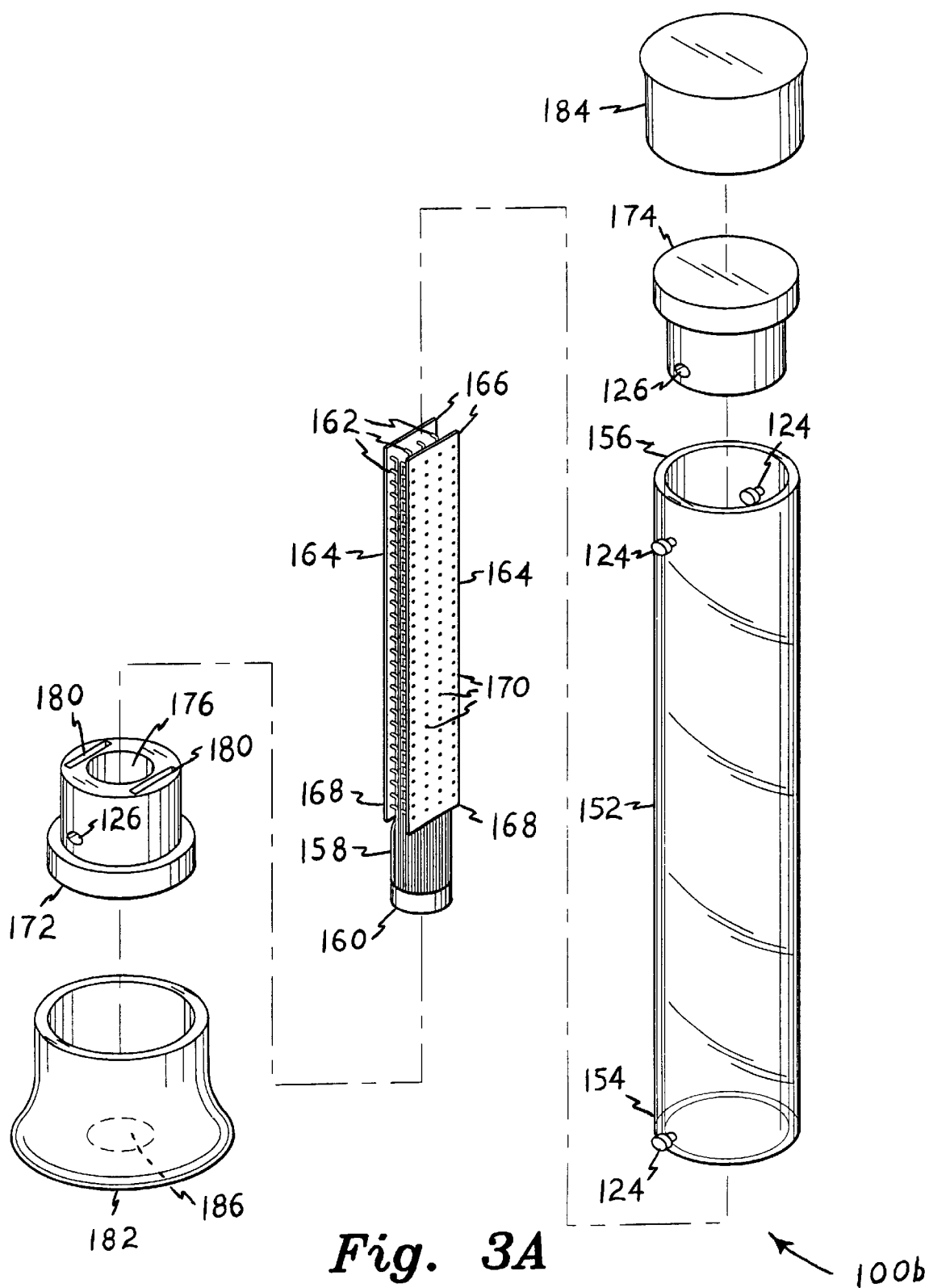
FIG. 3A is an exploded perspective view of a second embodiment of a light output fixture of the present system having a fiberoptic strand core secured by a double retaining plate configuration, showing the various components thereof.

FIG. 3A illustrates an alternative light output fixture 100b, using a different principle of light emission from that of the liquid or gel filled cartridge 102 of the light fixture 100a of FIG. 2. The light fixture 100b of FIG. 3A also includes an outer shield or cover, designated as cover 152, with opposite first and second ends 154 and 156. However, rather than installing a liquid or gel filled cartridge therein, a plurality of fiberoptic strands 158 are used to distribute light from the fixture 100b. These strands 158 are sealed together at their receiving ends by a light gathering lens 160, surrounding band, or other suitable means, with their opposite light output ends 162 being secured to one or more retainer elements 164 disposed generally parallel to the main strand bundle 158.

The retainer element or elements 164 each have a first end and opposite second end, respectively 166 and 168, and include a series of fiberoptic strand output end passages 170 therethrough, corresponding in number to the number of fiberoptic strands of the bundle 158. Each strand is bent to pass through one of the retainer element passages 170, and is sealed in place therein. Thus, when light is passed to the fiberoptic bundle 158 by means of its input or receiving end, the light travels through the strands 158 to pass outwardly from their output ends 162, generally normal to the local surface of the fiberoptic strand retaining member(s) 164. The light then passes through the outer cover or shield 152, to illuminate the immediate area.

The fiberoptic bundle and retainer element assembly 158 and 164 is secured within the outer tube or cover 152 by means of opposite first and second end caps, respectively 172 and 174, which capture the bundle and retainer assembly 158, 164 and cover tube 152 therebetween. Each end cap 172, 174 has an internal configuration adapted for positively securing the fiberoptic bundle and retainer element assembly 158, 164 therein. The first end cap 172 clearly shows this retaining configuration in FIG. 3A of the drawings. The end cap 172 includes a central fiberoptic connector port 176 therethrough, for installing a fiberoptic cable to the fixture assembly 100b essentially in the manner shown and described for the fixture 100a of FIG. 2. Alternatively, the fixture assembly 100b (or 100a) may be equipped with an internal or female conical receptacle 178 into which a male connector end 56a, 56b, etc. may be removably inserted, as shown in the exploded assembly of FIG. 6 of the drawings.

The two end caps 172, 174 also include slots, grooves, or other suitable means for retaining the two ends 166, 168 of the fiberoptic strand retainer(s) 164. In the case of the two opposed retainer plates 164 of the assembly of FIG. 3A, two corresponding opposed slots 180 are formed in each end cap (shown only in the first end cap 172), on opposite sides of the central fiberoptic connector port and light passage 176. The opposite ends 166, 168 of the retainer(s) 164 are seated within these slots 180, to secure the fiberoptic output and retainer assembly 158, 144 concentrically within the outer cover or shield 152.

As in the case of the fiberoptic light fixture 100a of FIG. 2, the fixture 100b may also be installed in series with a pair of fiberoptic cables 50a, 50b, etc., if so desired. This is achieved in the same manner as that described for such a configuration for the fixture 100a, i. e., by installing a first end cap 172 and corresponding dust cap or seal 182 (with its central fiberoptic cable passage 184) on both ends 154 and 156 of the outer cover 152. At least some of the fiberoptic strands of the bundle 158 may extend straight through the fixture 100b, to pass light completely through the device to the output fiberoptic cable.

As in the case of the first fixture 100a of FIG. 2, the light fixture 100b of FIG. 3A may also be disassembled to provide interchangeability for the fiberoptic bundle and retainer assembly 158, 164 installed therein. The means for accomplishing the disassembly of the light fixture 100b is essentially the same as that provided for the fixture 100a, i. e., a series of pins 124 is provided adjacent the opposite ends 154, 156 of the outer cover 152, with the larger diameter retaining ends of the pins 124 frictionally engaging corresponding passages 126 formed radially in the sides of the end caps 172, 174. Thus, one of the dust caps or seals 182 or 184 may be removed from its corresponding end cap 172 or 174, the end cap 172 or 174 removed from the corresponding end 154, 156 of the outer cover 152, and the fiberoptic bundle and retainer assembly 158, 164 withdrawn from within the outer cover 152. A different fiberoptic bundle and retainer assembly may be installed therein, by reversing the disassembly operation.

The fiberoptic bundle and retainer assembly 158, 164 of the fiberoptic light fixture embodiment 100b of FIG. 3A, will be seen to emanate light essentially in two opposite directions, generally 180 degrees from one another, due to the flat, parallel configuration and disposition of the two retainer plates 164. However, it will be seen that any of a number of different retainer configurations may be provided, with these different retainer configurations serving to distribute light output radially in various directions or orientations from the light output fixture, as desired.

Figure 3B:
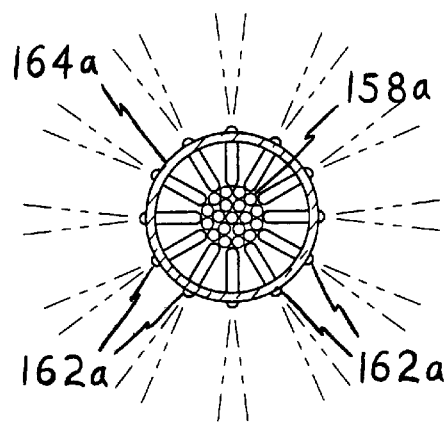
FIGS. 3B through 3E are cross sectional views of exemplary fiberoptic strand retaining devices for installation in the lighting fixture of FIG. 3A.

FIGS. 3B through 3E illustrate end views of a few of many possible fiberoptic bundle and retainer configurations. In FIG. 3B, a cylindrical fiberoptic strand or bundle retainer 164a is illustrated, with a plurality of fiberoptic strands forming a bundle 158a enclosed therein. The output ends 162a of the strands 158a pass through a corresponding series of passages (not shown, but similar to the passages 170 formed in the retainer plates 164 of FIG. 3A), to provide illumination radiating generally 360 degrees radially and evenly from the retainer 164a.

Figure 3C:
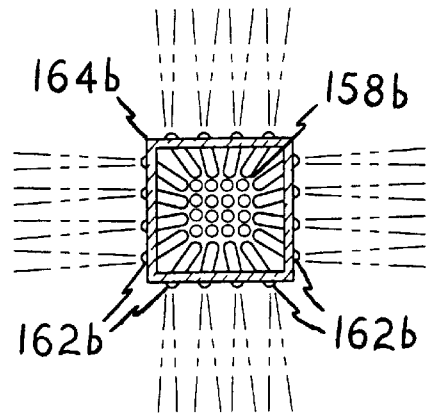

FIG. 3C illustrates another alternative, comprising a series of fiberoptic strands or fiberoptic bundle 158b captured by a retainer 164b having a generally square cross section. The light output ends 162b of the fiberoptic strands or bundle 158b emit light from each of the four flat faces of the retainer 164b, thus providing a series of four "light panels" disposed ninety degrees to one another.

Figure 3D:
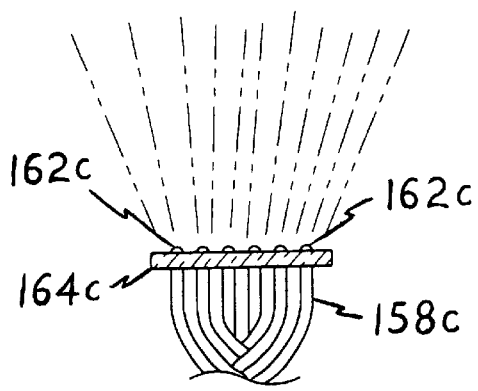

FIG. 3D illustrates another variation, similar to the embodiment of FIG. 3A if one of the two retainer panels 164 were not used. In the embodiment of FIG. 3D, a single flat retainer panel or plate 164c is provided, with all of the light output ends 162c of the fiberoptic bundle or strands 158c passing through the single retainer panel 164c. It will be seen that this tends to produce light output emanating generally in a single direction, with the light output decreasing angularly to either side of the centerline of the plate 164c. Relatively little or no light is emitted to the sides or to the back of the plate 164c, depending upon the properties, coatings, etc. of the individual fiberoptic strands 158c.

Figure 3E:
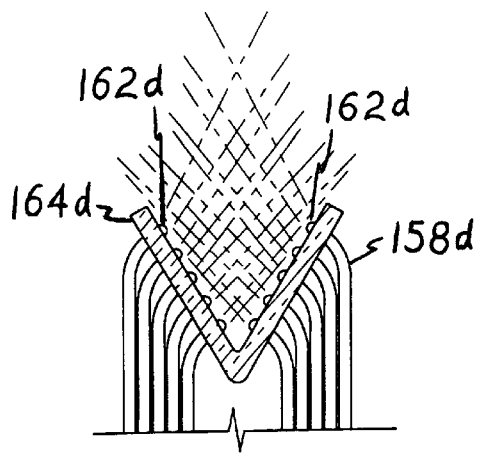

Finally, FIG. 3E illustrates an even more directional light output embodiment, in which the fiberoptic strand retainer 164d is formed in a V cross section, with the fiberoptic strands 158d entering the retainer 164d from outside the V and with their light emitting ends 162d disposed to the inside of the V. This results in a relatively narrow concentration of the light output within the angle of the V, with relatively little or no light emitted beyond the angle of the V. It will be seen that such a V shape retainer 164d could have a more curvilinear cross section, if desired, in the form of an arc or elliptical section, in order to focus the light output more precisely. As noted above, the examples of FIGS. 3A through 3E are but a small number of the myriad possible cross sectional shapes for such retainers, with a virtually unlimited number of additional retainer shapes being possible.

Figure 4:
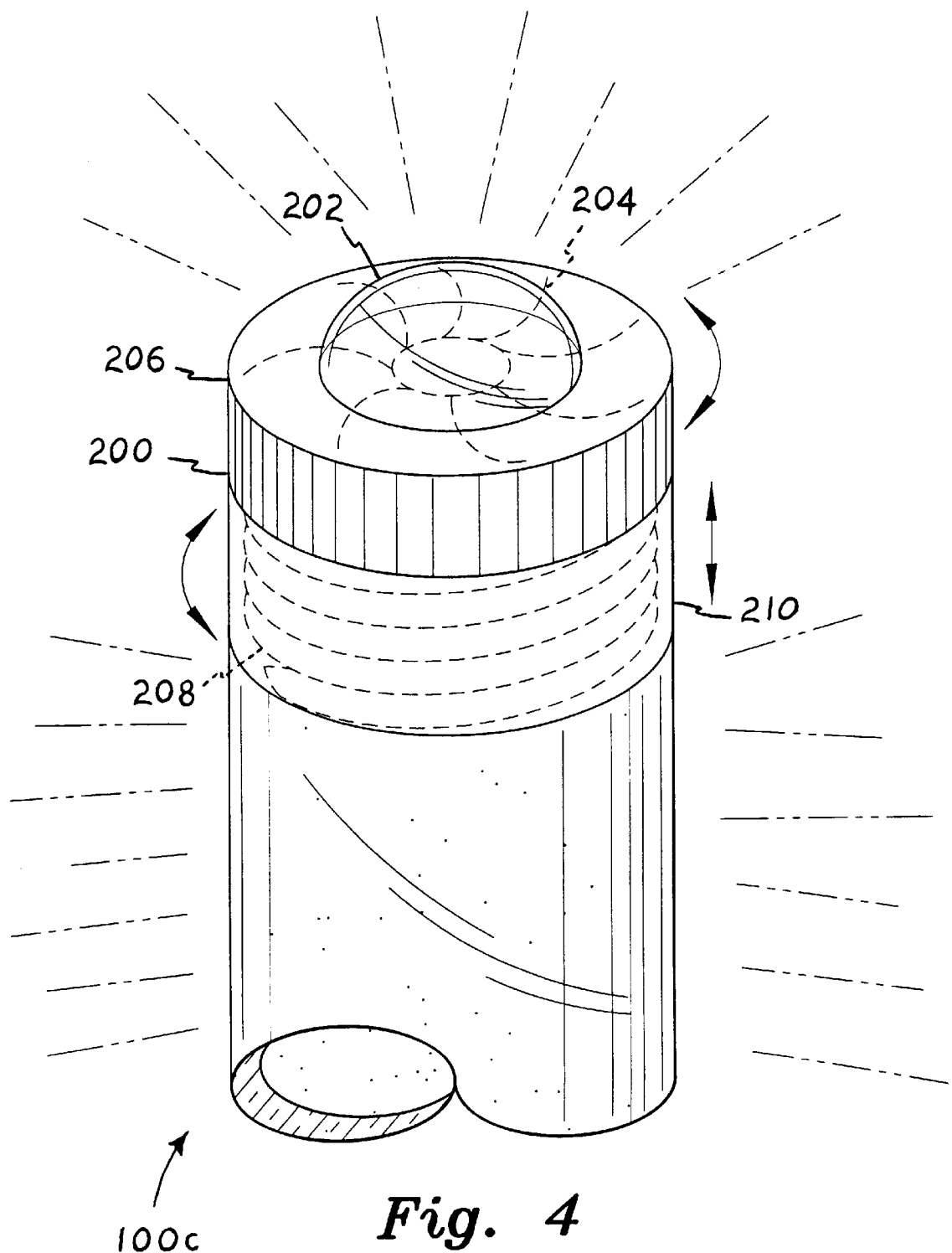
FIG. 4 is a broken away perspective view of an alternative light fixture embodiment showing a radially emanating lens therefor, with brightness and beam width control means provided therewith.

To this point, the primary direction of light emission from the light fixtures 100a and 100b has been described as radially disposed. However, the present lighting system may also provide for axial light emission from the fixtures, if so desired. FIG. 4 illustrates such an embodiment, showing the broken away end of a fixture 100c. The end cap assembly 200 of the fixture 100c includes a lens or translucent cover 202 therein, providing light output axially from the end of the device. The end cap assembly 200 further includes mechanisms for adjusting both the intensity and the angular spread of light emitted from the lens 202.

The light intensity may be adjusted by means of a conventional iris type shutter 204, disposed immediately behind the lens 202. The aperture of the iris 204 is controlled by rotation of the first or outer ring 206, adjacent the lens 202. This mechanism is conventional, and thus no further detail is described herein. Other conventional light intensity control means may be incorporated in lieu of the iris type shutter 204, if desired.

The angular spread of the light beam distributed from the lens 202 may be controlled by selectively retracting or extending the lens 202 and accompanying mechanism relative to the first or outer ring 206. Retracting the lens 202 into the ring 206, results in the peripheral light from the lens 202 being blocked by the inner edge of the toroidal ring 206, adjacent the lens 202. This is achieved by a conventional threaded screw arrangement 208, whereby turning the lower or second ring 210 extends or withdraws the lens 202 relative to the first ring 206 to control the beam width.

In conclusion, the present fiberoptic lighting system provides a much safer means of providing light in an emergency situation where a fuel, explosive, chemical, or other hazardous spill has occurred. The absence of electrically conductive, metallic elements in all of the components of the present system extending from the light source, results in an extremely safe means of providing light where an ignition source could prove hazardous. the various embodiments of light fixtures disclosed herein, provide various alternatives for providing light either radially or axially, or both, from the fixtures. The interchangeability of the internal light emitting components (gel or fiberoptic strands and retainer), provide further flexibility. This flexibility of the light fixtures also enables them to be connected at the distal ends of the fiberoptic cables, or to be connected in series along a length of two or more cables at some intermediate point therealong.

The flexibility and adaptability of the present system provides additional features and benefits, as well. For example, light filtration means may be provided, in order to filter out ultraviolet, infrared, and/or other wavelengths of light as desired. Ultraviolet filtration may be provided conventionally at the light source, as is known in the art, in order to preclude deterioration of acrylite or other plastic materials which may be used for the fiberoptic cables of the present invention, and other components. This provides additional benefits, in that ultraviolet light is known to cause various reactions in certain chemicals, with this hazard being eliminated when an ultraviolet filter is used.

The present lighting system will also prove to be more economical to operate and maintain than conventional electric lighting systems used in hazardous environments. Such conventional electric systems require the light source to be explosion and flame proof, which adds considerably to the cost of manufacturing such a system. Moreover, the electric light output elements must be explosive and flame proof as well. Recertification costs alone drive up the maintenance costs of such conventional systems considerably over the present invention, with present recertification costs (as this is written) being on the order of eighty dollars for the light source, with recertification being required every thirty to sixty days. The present system, with its remotely located light source and lack of metal and electrically conductive components extending outwardly from the light source, eliminates this recertification requirement and cost.

The present system may be applied to many other situations and environments than the hazardous spill situation cited herein as a primary use of the system. For example, the present system will be much appreciated in the boating and maritime industries as well. Explosive and flame proof lighting systems are a necessity in the bilge and engine room areas of boats, due to the strong possibility of trapped gasoline or other volatile vapors in such closed compartments. With the present system, the light source may remain on deck or in another open area, with the light fixture(s) being carried to the closed compartment of interest without concern for any explosive hazard from the light system.

The present system may also find use as a personal or other emergency lighting device, providing a position indication for individuals in the water or for a boat experiencing a problem. The light output fixture could be made to provide an intermittent (flashing) light output by periodically cycling the light source on and off, or periodically breaking the path of the light with a shutter or other means as desired. Again, the lack of electrically conductive components in the present system, once away from the light source, assures that the device will continue to operate regardless of the incursion of water or other liquids therein, and completely eliminates any possibility of electrical shock hazard to a user of the device. Thus, the present fiberoptic lighting system will prove to be a most valuable article of equipment for those who have need for emergency lighting in various situations, as well as in other environments where a dependable and non-electrical lighting system is desired.

It is to be understood that the present invention is not limited to the sole embodiment described above, but encompasses any and all embodiments within the scope of the following claims.

We claim:

1. A fiberoptic lighting system including a plurality of light transmitting elements, comprising:

at least one light source having at least one light output port;

at least one fiberoptic cable having a light source connection end and a distal light output end opposite said light source connection end;

light source connector means for temporarily and removably securing said light source connection end of said at least one fiberoptic cable to said at least one light output port of said at least one light source;

at least one light output fixture, including;
a translucent light transmission cartridge having a first end and a second end opposite said first end;
a translucent outer cover having a first end and a second end opposite said first end, and surrounding said light transmission cartridge;
a first end cap disposed at said first end of said light transmission cartridge and said outer cover;
a second end cap disposed at said second end of said light transmission cartridge and said outer cover;
each said end cap capturing said light transmission cartridge and said outer cover therebetween;
a fiberoptic cable connector port formed through at least one said end cap; and
light output fixture connector means for temporarily and removably securing said light output end of said at least one fiberoptic cable to a corresponding said fiberoptic cable connector port of said at least one light output fixture.

2. The fiberoptic lighting system according to claim 1, wherein at least said at least one fiberoptic cable, said at least one light output fixture, and said light output fixture connector means are devoid of metallic and electrically conductive components for safely using in fire hazard, explosive hazard, and chemical hazard environments.

3. The fiberoptic lighting system according to claim 1, wherein:
at least one said end cap is removably secured to said outer cover and said light transmission cartridge of said at least one of said light output fixtures; and
said light transmission cartridge is interchangeably disposed within said outer cover by means of said removably secured end cap.

4. The fiberoptic lighting system according to claim 1, wherein said at least one fiberoptic cable and said at least one light output fixture further include light output means selected from radially disposed light output means and axially disposed light output means.

5. The fiberoptic lighting system according to claim 1, further including splitter means for temporarily and removably connecting a single one of said light transmission elements to a plurality of said light transmission elements.

6. The fiberoptic lighting system according to claim 1, further including light filtration means and light output adjustment means.

7. A fiberoptic lighting system including a plurality of light transmitting elements, comprising:
at least one light source having at least one light output port;
at least one fiberoptic cable having a light source connection end and a distal light output end opposite said light source connection end;
light source connector means for temporarily and removably securing said light source connection end of said at least one fiberoptic cable to said at least one light output port of said at least one light source;
at least one light output fixture, including;
a plurality of fiberoptic strands each having a light receiving end and a light output end opposite said light receiving end;
at least one fiberoptic strand retainer element;
said at least one retainer element including a plurality of fiberoptic strand light output end passages therethrough, and capturing each said light output end of said fiberoptic strands therein for radiating light therefrom;
a translucent outer cover having a first end and a second end opposite said first end, and surrounding said fiberoptic strands and said at least one retainer element;
a first end cap disposed at said first end of said at least lone retainer element and said outer cover;
a second end cap disposed at said second end of said at least one retainer element and said outer cover;
each said end cap capturing said plurality of fiberoptic strands, said at least one retainer element, and said outer cover therebetween; and
a fiberoptic cable connector port formed through at least one said end cap; and
light output fixture connector means for temporarily and removably securing said light output end of said at least one fiberoptic cable to a corresponding said fiberoptic cable connector port of said at least one light output fixture.

8. The fiberoptic lighting system according to claim 7, wherein at least said at least one fiberoptic cable, said at least one light output fixture, and said light output fixture connector means are devoid of metallic and electrically conductive components for safely using in fire hazard, explosive hazard, and chemical hazard environments.

9. The fiberoptic lighting system according to claim 7, wherein:
at least one said end cap is removably secured to said outer cover and said retainer element of said at least one said light output fixture; and
said retainer element and said plurality of fiberoptic strands are interchangeably disposed within said outer cover by means of said removably secured end cap.

10. The fiberoptic lighting system according to claim 7, wherein said at least one fiberoptic cable and said at least one light output fixture further include light output means selected from radially disposed light output means and axially disposed light output means.

11. The fiberoptic lighting system according to claim 7, further including splitter means for temporarily and removably connecting a single one of said light transmission elements to a plurality of said light transmission elements.

12. The fiberoptic lighting system according to claim 7, further including light filtration means and light output adjustment means.

13. A fiberoptic lighting system including a plurality of light transmitting elements, comprising:
a light source having at least one light output port;
a plurality of fiberoptic cables each having a light source connection end and a distal light output end opposite said light source connection end;
light source connector means for temporarily and removably securing said light source connection end of at least one of said fiberoptic cables to said at least one light output port of said light source;
a plurality of light output fixtures, said fiberoptic cables and said light output fixtures further include light output means selected from radially disposed light output means and axially disposed light output means;
said light output fixtures each having at least one fiberoptic cable connector port;
light output fixture connector means for temporarily and removably securing said light output end of each of said fiberoptic cables to a corresponding said fiberoptic,cable connector port of one of said plurality of light output fixtures; and
at least said fiberoptic cables, said light output fixtures, and said light output fixture connector means being devoid of metallic and electrically conductive components for safely using in fire hazard, explosive hazard, and chemical hazard environments.

14. The fiberoptic lighting system according to claim 13, wherein at least one of said light output fixtures further comprises:

a translucent light transmission cartridge having a first end and a second end opposite said first end;

a translucent outer cover having a first end and a second end opposite said first end, and surrounding said light transmission cartridge;

a first end cap disposed at said first end of said light transmission cartridge and said outer cover;

a second end cap disposed at said second end of said light transmission cartridge and said outer cover;

each said end cap capturing said light transmission cartridge and said outer cover therebetween; and at least one said end cap having said fiberoptic cable connector port formed therethrough for passing light from said fiberoptic cable secured thereto, to said light transmission cartridge of said at least one of said light output fixtures.

15. The fiberoptic lighting system according to claim 14, wherein:

at least one said end cap is removably secured to said outer cover and said light transmission cartridge of said at least one of said light output fixtures; and said light transmission cartridge is interchangeably disposed within said outer cover by means of said removably secured end cap.

16. The fiberoptic lighting system according to claim 13, wherein at least one of said light output fixtures further comprises:

a plurality of fiberoptic strands each having a light receiving end and a light output end opposite said light receiving end;

at least one fiberoptic strand retainer element;

said at least one retainer element including a plurality of fiberoptic strand light output end passages therethrough, and capturing each said light output end of said fiberoptic strands therein for radiating light therefrom;

a translucent outer cover having a first end and a second end opposite said first end, and surrounding said fiberoptic strands and said at least one retainer element;

a first end cap disposed at said first end of said at least one retainer element and said outer cover;

a second end cap disposed at said second end of said at least one retainer element and said outer cover;

each said end cap capturing said plurality of fiberoptic strands, said at least one retainer element, and said outer covert therebetween; and at least one said end cap having said fiberoptic cable connector port formed therethrough for passing light from said fiberoptic cable secured thereto, to said plurality of fiberoptic strands of said at least one of said light output fixtures.

17. The fiberoptic lighting system according to claim 16, wherein:

at least one said end cap is removably secured to said outer cover and said retainer element of said at least one of said light output fixtures; and said retainer element and said plurality of fiberoptic strands are interchangeably disposed within said outer cover by means of said removably secured end cap.

18. The fiberoptic lighting system according to claim 13, further including splitter means for temporarily and removably connecting a single one of said light transmission elements to a plurality of said light transmission elements.

19. The fiberoptic lighting system according to claim 13, further including light filtration means and light output adjustment means.

* * * * *